Patented Dec. 12, 1939

2,183,173

UNITED STATES PATENT OFFICE 2,183,173

METHOD OF TREATING SALT AND RESULTING PRODUCT

Marnell Segura, Jefferson Island, La., assignor to Jefferson Island Salt Mining Company, Louisville, Ky., a corporation of Delaware No Drawing. Application December 22, 1938, Serial No. 247,299

8 Claims. (Cl. 23—243)

This invention relates to salt and its manufacture, and more particularly to a method of treating salt for the purpose of preventing the hardening or caking thereof during storage, and to the product resulting from that method.

As is well known, salt crystals are quite soluble in water, the result being that if salt is left unprotected the moisture in the air will dissolve a sufficient amount of salt from the exposed surfaces of the crystals to form a saturated brine. Should atmospheric conditions then change so as to cause an evaporation of the water from the saturated brine thus formed, the adjacent crystals will tend to become cemented together and the salt will harden or cake. In order to prevent or minimize this phenomenon, it has been the practice in the prior art to mix with the salt certain water insoluble substances which tend to maintain the salt in free-flowing condition, the substances most commonly used by salt manufacturers today being magnesium carbonate, calcium carbonate and tricalcium phosphate. However, the use of any of these substances in the amount necessary to inhibit caking or hardening results in a product containing approximately 1% of mineral matter other than salt, and imparts to brine solutions made from such salt a cloudy or turbid appearance and an alkaline reaction.

It has also been proposed to treat salt with glycerin for the purpose of preventing hardening or caking. While the glycerin treatment exhibits marked advantages over the processes embodying insoluble substances, the glycerin has a tendency to maintain the salt in a slightly moist condition which makes it somewhat difficult to handle with packaging machinery of the character generally in use. The cost of processing salt by the use of glycerin is also higher than is desired.

It is therefore one of the objects of the present invention to provide a new and superior method of treating salt which effectively prevents the hardening or caking thereof during storage, and products a less moist, more easily handled salt than the glycerin process.

Another object is to provide a novel process of the character described which is extremely simple in its application, and produces a salt of free-flowing characteristics at a substantially lower cost than the methods heretofore known to the art for the same purpose.

A further object is to provide a non-caking salt of novel composition which is substantially free from mineral impurities and substances insoluble in water, and will remain in a loose, uncaked condition under extreme changes in atmospheric conditions.

These and other objects will appear more fully upon a consideration of the description of the invention which follows.

I have discovered that a mere mechanical mixing with salt of a suitable quantity of an aqueous solution of sorbitol will result in a product which will not harden or cake, but will remain in a loose, practically dry condition, during any normally expected period of storage even when subjected to severe changes in atmospheric conditions. When salt is treated with sorbitol in accordance with the present invention, it would appear that the sorbitol solution forms a sort of coating for the salt crystals and acts as a buffer between the salt and the atmosphere, the sorbitol taking up the excess moisture from the air and giving it back again by evaporation upon changes in atmospheric conditions without permitting the moisture to dissolve the salt. Inasmuch as salt is not appreciably soluble in the sorbitol solution, the saturated brine condition which might produce hardening and caking does not occur.

Since sorbitol is a hexahydric alcohol or hexatol which readily dissolves in water, the addition of sorbitol to salt does not adversely affect the mineral purity thereof or increase the percentage of materials insoluble in water as determined by chemical analysis, nor does it result in a cloudy or turbid solution when the treated salt is dissolved in water. Sorbitol is tasteless and colorless, and may be added to and blended with salt with no deleterious effect whatsoever in so far as human consumption and commercial usage are concerned.

In treating salt according to the invention, an aqueous solution of sorbitol is added to the salt in such a way that the solution is thoroughly blended and incorporated with the mass of the salt, the amount and concentration of the sorbitol solution used depending upon the character of the salt being treated and the characteristics desired in the resultant product. While I have found that the desired results may be obtained by using amounts of sorbitol solution varying from $\frac{1}{50}$ of 1% to 5% by weight of the amount of the salt, the solution itself also varying in strength between 85% and 50% or less, it is believed that for ease of application, minimum cost and a product that will not harden and yet be dry enough to handle with ease, $\frac{1}{20}$ of 1% by weight of a 50% solution is the most satisfactory.

As one example of the application of the present invention, the following description of the treatment of evaporated vacuum pan salt may be considered as illustrative. The salt is first dried in known manner until it is in substantially bone-dry condition. A 50% aqueous solution of sorbitol is then prepared, either by dissolving pure sorbitol in water or by adding water to the commercially obtainable sorbitol solution known as "Sorban" which is of 85% concentration. The dried salt, which has preferably been cooled to a temperature of approximately 140° F., is then placed in a batch mixer of any suitable type, and the sorbitol solution is added to the salt in an amount equal to approximately $\frac{1}{20}$ of 1% by weight of the amount of the salt. The two substances are then mechanically mixed for a sufficient length of time to effect a thorough and uniform distribution of the solution throughout the mass of the salt. Upon completion of the mixing operation, the treated salt may be either transferred to a suitable bin for storage or immediately packaged. The treated salt as it comes from the mixer is sufficiently dry to permit ready handling and packaging, and will remain in a loose, uncaked condition, whether packaged or not, under the severest atmospheric conditions that might reasonably be expected to be encountered.

There is thus provided by the present invention an improved, effective and extremely simple process of treating salt in such a way as to prevent its hardening or caking during storage. Salt produced by this method is minerally pure, contains no added constituents which are insoluble in water or which in any way adversely affect the character of the salt, particularly for use in food stuffs, and is sufficiently dry to lend itself readily to handling and packaging in the usual manner. Inasmuch as the process requires only an intimate mixing of the salt and sorbitol solution, it can be easily carried out by the use of mixing equipment well known to the industry. Also, the sorbitol required for the method is readily available in large quantities on the open market and at a relatively low cost. Not only is the process cheaper and more effective in its results than any of the procedures hitherto known, but the product thereof possesses non-hardening, free-flowing qualities which render it a distinct improvement over the treated salts now on the market.

Although one example of the present method has been described in detail, including the specification of certain preferred proportions of the salt and sorbitol, it will be understood that the invention is capable of embodiment in specifically different procedural steps, and that the amount and strength of the sorbitol solution may be varied within reasonable limits depending upon the kind of salt being treated, the purposes for which the salt is to be used, and the expected conditions of storage. The use of sorbitol in the manner described to prevent hardening or caking is not limited to any particular type of salt, but may be used in treating rock salt, vacuum pan salt, and grainer or flake salt with equally good results. Likewise, it is apparent that the mixing of the sorbitol solution with the salt may be accomplished in other ways than in a mechanical mixer of the batch type; for example, the same ultimate result may be attained by a continuous mixing operation or by depositing the solution upon the salt by the use of a spray.

Various other changes, which will now become apparent to those skilled in the art, may be made in the details of the process and in the specific character of the product without departing from the spirit of the invention. Reference is therefore to be had to the appended claims for a definition of the limits of the invention.

What is claimed is:

1. A method of treating salt for the purpose of preventing its hardening or caking consisting of adding to the salt an aqueous solution of sorbitol in an amount between approximately $\frac{1}{50}$ of 1% and 5% by weight of the amount of the salt.

2. A method of treating salt for the purpose of preventing its hardening or caking consisting of adding to the salt a 50% aqueous solution of sorbitol, the amount of the solution being approximately $\frac{1}{20}$ of 1% by weight of the amount of the salt.

3. A method of treating salt for the purpose of preventing its hardening or caking consisting of coating the salt crystals with an aqueous solution of sorbitol.

4. A treated salt consisting of a mixture of salt and sorbitol, the sorbitol being in the form of an aqueous solution deposited upon the salt crystals in such an amount as to inhibit hardening or caking of the salt but without rendering the salt so moist as to deprive it of its free-flowing characteristics.

5. A non-hardening salt consisting of a mixture of salt and an aqueous solution of sorbitol, the amount of the sorbitol solution being between about $\frac{1}{50}$ of 1% and 5% by weight of the amount of the salt.

6. A non-hardening salt containing approximately $\frac{1}{20}$ of 1% by weight of a 50% aqueous solution of sorbitol.

7. A treated salt containing a relatively small amount of sorbitol, the sorbitol being deposited upon the salt crystals in the form of an aqueous solution of such concentration and amount as to effectively inhibit caking or hardening of the salt.

8. A treated salt containing sorbitol in the form of an aqueous solution deposited upon the crystals of the salt, the amount of sorbitol being approximately $\frac{1}{40}$ of 1% by weight of the amount of the salt.

MARNELL SEGURA.